United States Patent
Lerch et al.

(10) Patent No.: US 12,418,699 B2
(45) Date of Patent: Sep. 16, 2025

(54) TRACKING MEDIA-DELIVERY-DEVICE IN RELATION TO MEDIA PRESENTATION AND EXPOSURE

(71) Applicant: The Nielsen Company (US), LLC, New York, NY (US)

(72) Inventors: Ronny Lerch, San Antonio, FL (US); Meryem Berrada, Beacon, NY (US); Alan Lekah, New York, NY (US); John Zoldos, Albany, OR (US); James Anderson, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 42 days.

(21) Appl. No.: 18/338,136

(22) Filed: Jun. 20, 2023

(65) Prior Publication Data
US 2024/0430525 A1    Dec. 26, 2024

(51) Int. Cl.
| | |
|---|---|
| H04N 21/218 | (2011.01) |
| H04N 21/24 | (2011.01) |
| H04N 21/442 | (2011.01) |
| H04N 21/45 | (2011.01) |
| H04N 21/647 | (2011.01) |
| H04N 21/658 | (2011.01) |

(52) U.S. Cl.
CPC ..... *H04N 21/4532* (2013.01); *H04N 21/6582* (2013.01)

(58) Field of Classification Search
None
See application file for complete search history.

(56) References Cited

U.S. PATENT DOCUMENTS

| | | | |
|---|---|---|---|
| 2014/0259039 A1* | 9/2014 | Nielsen | H04N 21/44218 725/14 |
| 2015/0319490 A1* | 11/2015 | Besehanic | H04N 21/437 725/19 |

* cited by examiner

*Primary Examiner* — Brian T Pendleton
*Assistant Examiner* — Jean D Saint Cyr
(74) *Attorney, Agent, or Firm* — McDonnell Boehnen Hulbert & Berghoff LLP

(57) ABSTRACT

A system and method for attributing media-exposure to a particular media-delivery device, such as a media player, at a panelist site. An example system includes a first meter configured to detect media presentation by a media-presentation device at the panelist site, and a second meter configured to detect media transmission at the panelist site to the media-delivery device at the panelist site. Further, the example system includes program instructions stored in non-transitory data storage and executable by at least one processor to carry out operations including (i) correlating the detected media presentation at the panelist site with the detected media transmission at the panelist site to the media-delivery device at the panelist site and (ii) based on the correlating, associating the panelist media-exposure with the media-delivery device, such as by generating record indicating the association. This association may then be used as a basis to enhance audience ratings.

16 Claims, 5 Drawing Sheets

TRACKING MEDIA-DELIVERY-DEVICE IN RELATION TO MEDIA PRESENTATION AND EXPOSURE

SUMMARY

In order to measure the extent to which people of various demographics are exposed to media content presented by media presentation devices such as televisions or radios for instance, a media-monitoring company can arrange to have media-monitoring devices or "meters" monitor media presentation in representative households or other sites. People who have their media exposure monitored may be considered "panelists," and the places where the monitoring occurs, such as home, offices, or other premises, may be considered "panelist sites."

At each of various panelist sites having a television and a media player that feeds media content to the television, for instance, the media-monitoring company may arrange for a meter to monitor and detect media presentation by the television.

By way of example, a meter may be connected as an intermediary between the media player and the television so that the meter can monitor media content that gets delivered to the television for presentation. Such a meter may also be configured to detect the power on or off state of the television, so that the meter can limit its media-presentation monitoring to times when the television is on and therefore likely presenting the media content that is being delivered to the television. Alternatively, a meter may be integrated with the television and may more directly monitor media presentation by monitoring a media buffer and/or other circuitry or logic of the television. Still alternatively, a meter may be positioned near the television and may monitor media presentation by monitoring acoustic audio output and/or display output from the television. Other arrangements are possible as well.

A representative meter, alone or through interworking with a back-end system, may monitor media presentation and thus panelist media exposure in various ways. For example, the meter may generate query digital fingerprints representing component features of the media content presented and may send those query fingerprints to the back-end system, which may match the query fingerprints with reference fingerprints representing known media content, in order to identify the media content (e.g., a specific program or ad, and/or a specific channel) presented. Alternatively, if the media content is watermarked with a content ID or otherwise contains or is accompanied by data that identifies the content, the meter may decode or otherwise read or ascertain that ID or other data from the media content and may report that information to the back-end system. Further, in these or other examples, the back-end system may correlate this media-exposure data with demographics of the panelist or panelist site at issue, to help establish associated ratings statistics that may facilitate commercial processes such as ad placement and other content delivery.

One technical issue that may arise in practice is that monitoring media exposure in this or a similar manner may not identify the device at the panelist site that delivered the media content to the television or other media-presentation device for presentation. Yet in establishing ratings statistics, it may also be useful to identify that media-delivery device, such as to determine the brand, model, and/or other identifying information of the media-delivery device and to associate that identifying information with the media-exposure data.

Identifying information about the media-delivery device that was responsible for delivering the media to a media-presentation device for presentation may help enhance ratings statistics and thereby facilitate more advanced or different commercial processes. For instance, collecting such information may support a finding that panelists have been exposed to media that was served at panelist sites by media-delivery devices of a particular brand. And finding that panelists have been exposed to media served by media-delivery devices of a particular brand may justify placing ads in content served by that brand of media-delivery device in particular, among other possibilities.

The present disclosure provides a mechanism to help address this issue, particularly as to media content received through over-the-top (OTT) (e.g. broadband Internet) streaming or the like, among other possibilities.

In accordance with the disclosure, a computing system could monitor both (i) media presentation at a panelist site and (ii) media streaming at the panelist site, and the computing system could correlate the monitored media presentation with the monitored media streaming, as a basis to find that an endpoint of the media streaming at the panelist site is the media-delivery device responsible for delivering the media that is the subject of the media presentation.

For instance, (i) the computing system could detect media presentation by a media-presentation device at the panelist site, (ii) the computing system could detect a streaming-media session having a media-delivery device at the panelist site as a receiving endpoint, and (iii) the computing system could correlate those two pieces of information with each other based on common timestamps and/or other correlation data, as a basis to establish that the media-delivery device is the device that delivered the media to the media-presentation device to facilitate the presentation. The computing system may then generate an associated record indicating that the media-delivery device (e.g., that a particular brand, model, and/or instance of such a device) delivered the media to the media-presentation device to facilitate the media presentation and thus the panelist exposure to that media.

These as well as other aspects, advantages, and alternatives, will become apparent to those of ordinary skill in the art by reading the following detailed description, with reference where appropriate to the accompanying drawings. Further, it should be understood that the disclosure provided in this summary elsewhere in this document is provided by way of example only and that numerous variations and other examples may be possible as well.

DETAILED DESCRIPTION

Figure 1:
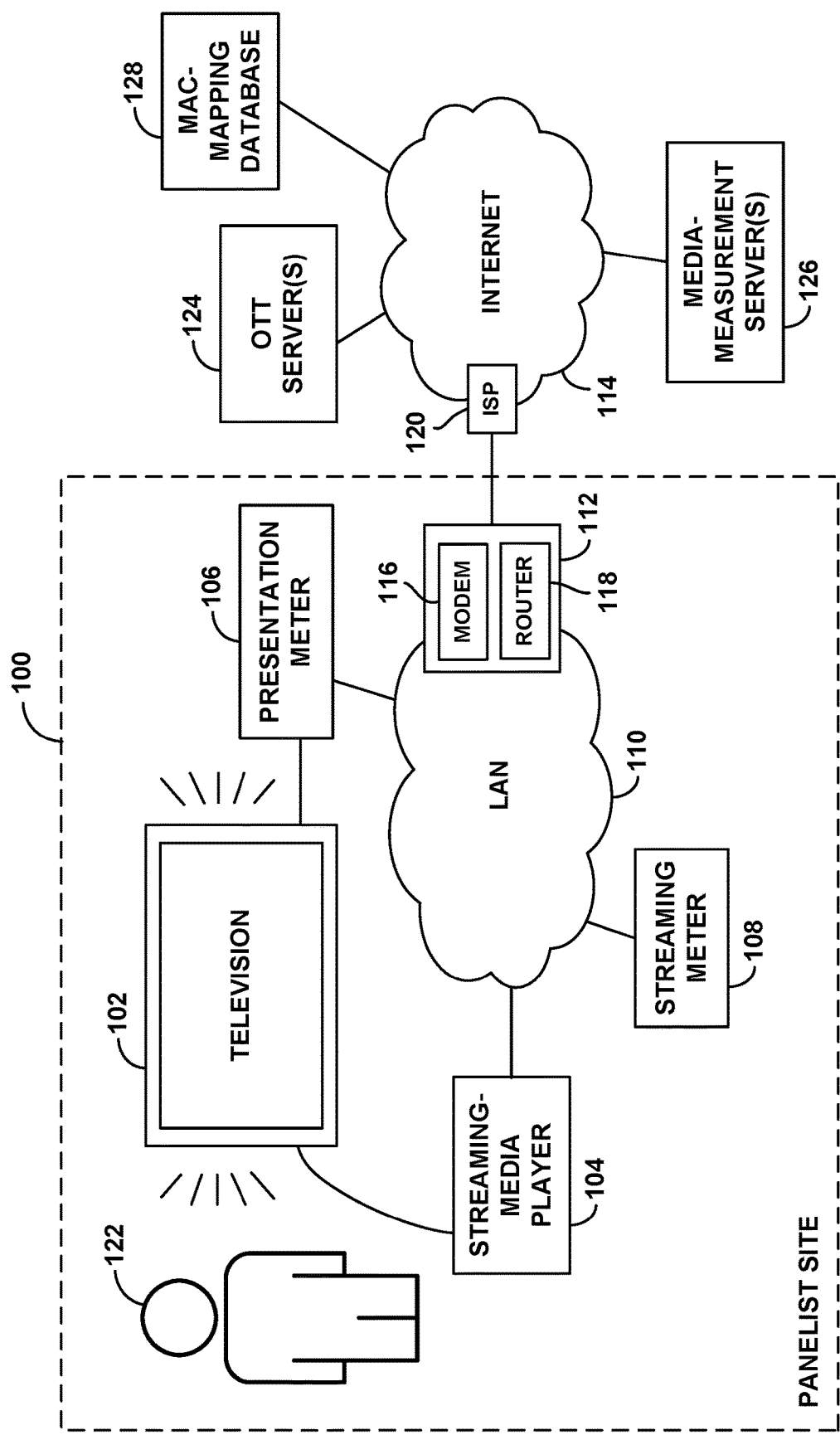
FIG. 1 is a simplified block diagram illustrating an example system.

The present description will discuss example implementation in the context of a panelist site in which the media-presentation device is a television and the media-delivery device is a separate interconnected streaming media player that is configured to receive OTT streaming media and output the received media for delivery directly or indirectly to the television for presentation. It will be understood that the disclosed principles could apply in other situations as well. For instance, the media-presentation device and/or media-delivery device could take other forms, and the media-delivery device could be integrated with the media-presentation device, e.g., as a smart television having OTT applications, among other possibilities.

More generally, it will be understood that the arrangements and processes described could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

Referring to the drawings, as noted above, FIG. 1 is a simplified block diagram of an example system in which various disclosed features could be implemented.

As shown in FIG. 1, the example system includes, at a panelist site 100 (e.g., a panelist's home or office, among other possibilities), a television 102, a streaming-media player 104, a first meter 106, and a second meter 108. Further, the panelist site 100 includes a local area network (LAN) 110, with the streaming-media player 104, the first meter 106, and the second meter 108 sitting as example nodes on the LAN 110. And the panelist site 100 includes network equipment 112 that facilitates communication on the LAN 110 and communication between the LAN 110 and the internet 114 or another wide area network.

The network equipment 112 in the example arrangement includes a modem 116 and a router 118. The modem 116, which may be a cable, satellite, cellular, or other modem, could be configured to communicate with an associated internet service provider (ISP) (e.g., cable or satellite head end, or cellular core network) 120 that provides connectivity with the internet 114. And the router 118, which may itself also sit as a node on the LAN 110, could be configured to route packet-based communications between nodes on the LAN 110 and, via the modem 116, between the LAN 110 and the internet 114.

The modem 116 may have an assigned Internet Protocol (IP) address that is globally-routable on the internet 114 (i.e., a global IP address). For instance, when the modem 16 is initially powered on, the modem 116 may register its presence with the ISP 120, and the ISP 120 may dynamically assign a global IP address to the modem 116, or the modem 116 may have a statically assigned global IP address. This global IP address assigned to the modem 116 may also pass through to the router 118 as an effective global IP address of the router 118.

Each LAN node may also have an assigned IP address that is locally-routable on the LAN 110 (i.e., a local IP address). For instance, the router 118 may have a statically assigned local IP address. Further, as each other node is initially powered on and in communication with the router 118, the node may register its presence with the router 118, and the router 118 may dynamically assign a local IP address to the node, or the node may a statically assigned local IP address. With these assigned local IP addresses, the LAN nodes may then engage in packet-based communication on the LAN 110. Further, the LAN nodes may engage in packet-based communications on the internet 114, through the router 118, the modem 116, and the ISP 120, with the router 118 performing network address translation between the device's local IP address and the router/modem's global IP address.

Each LAN node may also have a permanent or semi-permanent hardware address, typically a Media Access Control (MAC) address assigned to a network interface of the node during manufacturing. This MAC address may uniquely identify the node. For instance, a node's MAC address may include a prefix or one or more other components keyed to the node's manufacturer and thus possibly indicating a brand of the node, and a node's MAC address might also include one more components corresponding with the node's model or other such information. It may therefore be possible to map a node's MAC address to node-identifying information such as the make and model of the node, among other possibilities. For instance, an internet-accessible database may include this mapping. So given knowledge of a node's MAC address, an entity may be able to query that database to obtain the node-identifying information based on the MAC address.

In practice, the router 118 may store a mapping between each node's assigned local IP address and the node's MAC address. Further, in some cases, a node's MAC address may be included in MAC-layer headers of IP packets transmitted to or from the node on the LAN 110. Alternatively or additionally, it may be possible to map a node's IP address to the node's MAC address (and vice versa), by use of the Address Resolution Protocol (ARP). For instance, given knowledge of a node's IP address, an entity on the LAN could broadcast an ARP request requesting the MAC address associated with that particular IP address, and the node or the router 118 may then issue an ARP response providing an indication of the associated MAC address.

The television 102 at the panelist site 100 could be configured to present multimedia content, which could include video content and audio content, and could include program content (e.g., television programs and/or movies) and/or ad content (e.g., commercial breaks). In some implementations, the television may display video content while outputting corresponding audio. In other implementations the television may display video content and an associated audio-video receiver and/or other sound system could output the associated audio. Further, other audio-video display mechanisms could be alternatives to a television. As further shown, an example panelist (e.g., a human being) 122 at the panelist site 100 may thereby be exposed to this media presentation.

The streaming-media player 104 could comprise an OTT streaming media player, which could be configured to inter-work with various OTT servers 124 (e.g., an OTT platform comprising one or more associated servers) on the internet, to receive and play streaming media content of various streaming-media channels, and could output the received content in the arrangement shown for presentation by the television 102. As noted above, the streaming-media player 104 may be arranged to provide this media output directly or indirectly to the television 102 for presentation. For instance, the streaming-media player 104 may be connected by a High Definition Multimedia Interface (HDMI) or other cable directly with the television 102 and/or associated an audio-video system, and the streaming-media player 104 may provide the output through this cable connection, among other possibilities.

The streaming-media player 104, possibly through interaction with an associated OTT server 124, may also output various graphical user interfaces (GUIs) for presentation by the television 102, and may be configured to receive remote control input to facilitate user interaction with the GUIs. For instance, such a GUI may present a menu of various available streaming-media channels or services, each provided by a respective streaming-media service provider, and the GUI may allow user selection of a given streaming-media channel or service. Further, upon user selection of a desired streaming-media channel or service, the streaming-media player 104 may in turn present a GUI defining a menu specific to that selected streaming-media channel or service, from which a user may then select a media stream (e.g., a given movie, television program, video, etc.) to be received and played.

When a user selects a desired media stream to be played, the streaming-media player 104 may then engage in packet-based session-setup signaling with one or more associated OTT servers 124, to initiate and manage a streaming-media session that would stream the selected media stream in real-time to the streaming-media player 104 for playout. To start this process, for example, the GUI may have encoded a uniform resource locator (URL) in association with a thumbnail representation of the media stream at issue, and the streaming-media player 104 may thus send a request to that URL to begin streaming-session setup.

Without limitation, streaming sessions like this could operate according to any of a variety of well-known adaptive bit-rate streaming protocols, examples of which include Dynamic Adaptive Streaming over Hypertext Transfer Protocol (HTTP) (DASH), HTTP Live Streaming (HLS), and Smooth Streaming Transport Protocol (SSTP).

Under such a protocol, the streaming-media player 104 may first request and obtain from an OTT server 124 a manifest that lists media stream segments and bit-rate versions available per segment. The streaming-media player 104 may then proceed to request and obtain desired bit-rate versions of those segments in sequence, varying the bit rate over time as necessary to help account for changes in operational conditions. And as the streaming-media player 104 receives the segments, the streaming-media player 104 may buffer the segments and ultimately transcode them into a form suitable for output to and presentation by the television 102, thus facilitating largely real-time presentation of the selected media stream as the streaming-media player 104 receives the media stream.

These communications by the streaming-media player 104 may all be packet-based. For instance, to obtain a manifest for the selected stream, the streaming-media player 104 may transmit to a designated OTT server 124 one or more IP packets carrying a request for the manifest and may receive in response from the OTT server 124 one or more IP packets carrying the requested manifest. Likewise, to obtain the sequential segments of the media stream for playout, the streaming-media player 104 may transmit to a designated OTT server 124 a number of IP packets carrying requests for the segments and may receive in response from the OTT server 124 packets that carry the requested segments.

These packet-based communications may be keyed to the local IP address and/or MAC address of the streaming-media player, with network address translation (NAT) between that local IP address and the global IP address of the router/modem.

For instance, when the streaming-media player 104 sends a packet destined to the IP address of an OTT server 124, the streaming-media player 104 may designate in a header of that packet that the source IP address of the packet is the streaming-media player's local IP address, and that the destination IP address of the packet is the OTT server's global IP address. As that packet passes through the router 118, the router 118 may apply NAT, translating the designated local IP source address to the router's global IP address, and ensuring that there is a record or designation of a port or MAC address associated with the designated local IP source address so that the router 118 can properly route a response message.

When the OTT server 124 then sends a packet back in response, that response packet would designate that the source IP address of the packet is the OTT server's global IP address and that the destination IP address of the packet is the router's global IP address. Therefore, the packet will be routed ultimately to the router 118. Based on the record or designation of the port or MAC address associated with the local IP address from which the request originated, the router 118 may then translate the designated global IP destination address to the streaming-media player's local IP address. And the router 118 may then route the packet accordingly over the LAN to that local IP address, to facilitate receipt by the streaming-media player 104.

Continuing with reference to FIG. 1, the first and second meters 106, 108 at the panelist site 100 may operate as discussed above to log media presentation and streaming media activity respectively and to report that logged data to one or more cloud servers for use in generating audience ratings or for other purposes.

In particular, the first meter 106 may operate to monitor media presentation by the television 102, and the second meter 108 may be or function as a streaming meter that operates to monitor streaming-media activity on the LAN 110. Though these meters are shown as separate devices, they could alternatively be integrated together as an integrated device that has a view into media presentation and LAN activity. Further, the meters could interoperate with each other, such as by sharing their logged data with each other and possibly having just one of the meters assume responsibility for reporting both meters' logged data, among other possibilities.

In line with the discussion above, the first meter 106 may be configured to monitor both the on/off state of the television 102 and media presentation by the television 102. To facilitate monitoring the on/off state of the television 102, the first meter 106 could be connected as an intermediary in a path of power-supply to the television 102 if applicable. The first meter 106 could then monitor current flow and/or other electronic characteristics on this path, to determine when the television 102 is powered on and when the television 102 is powered off. And the first meter could limit its monitoring of media presentation by the television 102 to times when television 102 is powered on.

Further, the first meter 106 could be configured to monitor media presentation by the television in various ways. For instance, the first meter 106 could be connected as an intermediary in the media-delivery path between the streaming-media player 104 and the television 102 if applicable. The first meter 106 could then monitor media flowing on that path. Alternatively, the first meter 106 could include one or more microphones and/or cameras configured to receive the audio and/or video output presented by the television 102 and/or associated systems and could monitor that received audio and/or video.

The first meter 106 may interwork with one or more media-measurement servers 126 (e.g., an media-measurement platform comprising one or more associated servers) to detect media presentation by the television (and/or by an associated system), which may include identifying the media presented by the television 102, to facilitate generating audience ratings statistics and/or for other purposes. By way of example, the first meter 106 may detect the presence of media output by the television 102 and may obtain media-signature data such as digital fingerprints and/or watermark encoded information from the media and transmit the obtained media-signature data to a media-measurement server 126 for evaluation and recording.

As to digital fingerprints, for instance, as the media presentation proceeds, the first meter 106 may evaluate the media at issue and, based on the evaluation, generate digital query fingerprints each representing component characteristics of the media, such as key audio-frequency characteristics and/or key video-pixel characteristics. Further, the first meter 106 may include with each query fingerprint a timestamp indicating time of presentation of the media (e.g., media frame) represented by that particular query fingerprint. The first meter 106 may then periodically send bundles of these generated query fingerprints to a media-measurement server 126 for analysis.

In real-time or through post-processing, the media-measurement server 124 may then compare these provided query fingerprints with established reference digital fingerprints respectively representing known media content (e.g., known programs, ads, channels, etc.) And upon finding with sufficient certainty that the query fingerprints representing the media content presented at the panelist site 100 match reference fingerprints that represent specific known media content, the media-measurement server 126 could conclude that the media presented at the panelist site 100 is that specific media content.

As to watermarking, on the other hand, the media content as presented by the television 102 may be periodically watermarked (e.g., steganographically encoded) with media-identifying information or with data that correlates with media-identifying information.

Audio, for instance, could be watermarked with such data by including a supplemental audio waveform (optimally outside of human hearing range) that carries a representation of the data. By way of example, if a codeword that identifies the media is a sequence of digits, each digit could be sequentially encoded into the audio by adding a unique tone combination having a predefined correlation with the digit. Further, synchronizing symbols could be encoded as respective tone combinations as well, to demarcate the presence of the watermark.

With this arrangement, as the media presentation proceeds, the first meter 106 may monitor the audio in search of such a watermark and, upon finding a watermark, may decode the watermark by evaluating the sequential tone combinations, as a basis to extract the media-identifying information. The first meter 106 may thus record this media-identifying information over time with timestamps indicating when the watermarked media was presented. And the first meter 106 may likewise periodically send bundles of this media-identifying information to a media-measurement server 126, which may verify the information by comparison to reference information and may thus make a record that the media presented by the television 102 is the identified media content.

Whether through use of fingerprinting, watermarking, or other media-signature processes, the media-measurement server 126 may thereby establish a record indicating an extent and time that the identified media content was presented at the panelist site 100 and correspondingly an extent and time that one or more panelists at the panelist site 100 were exposed to that media. Further, the media-measurement server 126 may correlate this information with predetermined demographics regarding one or more panelists at the panelist site 100, to establish a record of the extent and time that one or more panelists of the predetermined demographics were exposed to the identified media. And the media-measurement server 126 may aggregate this information from multiple panelist sites as a basis to generate more comprehensive ratings statistics, which may help inform and control later program or ad placement and/or other actions.

Further in line with the discussion above, the second meter 108 may operate as a streaming meter, to monitor media transmission, such as streaming-media-related activity, on the LAN 110.

The second meter 108 could be configured to monitor streaming-media activity on the LAN 110 by monitoring the LAN 110 to detect the occurrence of particular network events that relate to streaming-media sessions. To facilitate this, the second meter 108 could be configured to operate as a router, a packet-sniffer, and/or another device that would have a view of packet traffic traversing the LAN 110. For instance, the second meter 108 may be integrated with the router 118 or may be an additional router on the LAN 110. Alternatively, the second meter 108 may be a standalone packet-sniffer.

When packets flow on the LAN 110, the second meter 108 may thus detect the flow of those packets. Further, the second meter 108 may read header data of the detected packets, to determine and record the source and destination IP addresses of the packets. And the second meter 108 may be able to read select payload data from the packets.

Based on this monitoring of the packets flowing on the LAN 110, the second meter 108 may be configured to detect the occurrence of particular network events related to streaming-media sessions, and the second meter 108 may be configured to report those detected occurrences to a media-measurement server 126. In an example implementation, the network events at issue could be or include events that indicate initiation and/or carrying out of real-time-packet-based media sessions for streaming of content.

Of the many packets that may flow on the LAN, the second meter 108 may filter the packets to focus its analysis on a packets that relate to streaming-media sessions, by setting a packet-sniffing filter keyed to one or more criteria associated with streaming-media sessions. For instance, the second meter 108 could filter the packets to a set of packets based on the packets having IP addresses, ports, and/or other header data known to be associated with streaming-media sessions.

By way of example, the second meter 108 could limit the packets that it evaluates on the LAN to those packets that have a source or destination IP address known to be associated with any of various streaming-media services that could potentially serve streaming-media sessions to the panelist site 100.

To facilitate this, the second meter 108 may be pre-provisioned with a list of the IP addresses of OTT servers and/or other servers with which a LAN node may interact to set up, manage, engage in, and/or otherwise facilitate a streaming-media session. The IP addresses on this list could include IP addresses of known streaming-media services, such as various OTT providers. Further, this list might itself be limited to IP addresses of streaming-services that are known to be available to the panelist site, such as free streaming-media services and pay streaming-media services to which the panelist site and/or one or more users at the panelist subscribe. In an example implementation, a media-measurement server 126 might be provisioned with data indicating one or more such subscriptions and may provision the second meter 108 with the list based on this data, among other possibilities.

With or without such filtering, the second meter 108 may thus detect when packet traffic on the LAN 110 represents streaming-media-session setup signaling and/or active streaming.

For example, by reading headers and/or payload of one or more packets flowing on the LAN 110, the second meter 108 may find, in one or more such packets, signaling requesting or providing media stream manifest data and/or media stream streaming segments, using various known streaming-media protocols, and perhaps further that those packets are to or from a known streaming-media-service IP address as noted above. The second meter 108 may thus use this information as a basis to determine that a streaming-media session is about to begin, is occurring, or has just occurred.

As another example, the second meter 108 could monitor the rate of packet flow on the LAN 110. When no streaming-media session is underway, the rate of packet flow on the LAN 110 may be relatively low or medium. Whereas, when a streaming-media session is underway, the rate of packet flow on the LAN 110 may be relatively high. (These low, medium, and high rates of packet flow may be set by engineering design or through machine learning, among other possibilities.) The second meter 108 may thus use this monitoring of the rate of packet flow on the LAN 110, also possibly keyed to known streaming-media-service IP addressing as noted above, as a basis to detect when a streaming-media-session is under way.

Based on this or other monitoring of LAN traffic, when the second meter 108 detects such streaming-media activity (e.g., predicts that such activity is about to begin, is occurring, or has just occurred), the second meter 108 may log the detected activity with associated timestamps and packet header information. For instance, as the second meter 108 detects packets on the LAN 110 and determines that the packets represent streaming-media-session activity, the second meter may make a record that indicates the identity and time of that streaming-media-session activity, along with packet header information such as source and destination IP addresses, ports, MAC addresses, etc.

Through this process, the second meter 108 may thus effectively or expressly detect when there is media transmission on the LAN 110 to the streaming-media player 104.

For example, one or more such records established by the second meter 108 may indicate setup of a streaming-media session to a local IP address that is assigned to the streaming-media player 104, which may indicate that media transmission in the form of that streaming-media session to that IP address will soon begin. Therefore, by detecting timing of such setup signaling in packets to or from that IP address, the second meter 108 may effectively detect upcoming media transmission to that IP address.

As another example, one or more such records established by the second meter 108 may indicate active flow of a streaming-media session to the local IP address assigned to the streaming-media player 104 and thus current media transmission to that IP address.

Further, as yet another example, one or more such records established by the second meter 108 may indicate ending of a streaming-media session (e.g., finishing of a streaming-media session) that was to the local IP address assigned to the streaming-media player 104, which may indicate that media transmission in the form of that streaming-media session to that IP address has just occurred. Therefore, by detecting timing of such signaling in packets to or from that IP address, the second meter 108 may effectively detect just finished media transmission to that IP address.

In an example implementation, the second meter 108 and/or another entity may further correlate any such detected media transmission with the MAC address of the destination LAN node, namely, the MAC address of the streaming-media player 104.

For instance, if the packets that the second meter 108 detects as an indication of media transmission happen to include the MAC address of the LAN node that is a destination for the media transmission, the second meter 108 could read that MAC address from one or more such packets and could note the MAC address as a record that detected media transmission is or was to the device having that MAC address. Alternatively, if the packets do not include the MAC address of the destination node, the second meter 108 may determine the MAC address of the destination node by issuing an ARP request as noted above. Namely, the second meter 108 may broadcast an ARP request requesting the MAC address associated with the IP address of that LAN node, and the LAN node and/or router 118 may respond to that ARP request with a response specifying the MAC address.

Further, based on this MAC address, the second meter 108 and/or another entity may identify the streaming-media player 104 as the destination of the detected media transmission. For instance, the second meter 108 may query an online MAC-mapping database 128, requesting node-identifying information based on the MAC address. And in response, the second meter 108 may receive information that identifies the node having that MAC address, which in this case would be the streaming-media player 104. For instance, as noted above, this information may include a brand of the node and possibly the model of the node, among other possibilities.

As noted above, a computing system could be configured to correlate the media presentation as detected by the first meter 106 with the media transmission to the streaming-media player 104 as detected by the second meter 108, in order to associate the resulting panelist media-exposure with the streaming-media player 104 as the media-delivery device that delivered the media to facilitate the presentation. Namely, this correlation could establish that a device having the determined node-identifying information is the device at the panelist site 100 that was responsible for delivering the media that the television 102 presented to the panelist 122, i.e., that the media-delivery device that delivered the media to the television 102 to facilitate the presentation and associated media exposure has that determined node-identifying information.

Identifying the media-delivery device at the panelist site 100 that is the device responsible for delivering the media to facilitate the media presentation by the television 102 and thus the associated panelist media-exposure could usefully facilitate taking or controlling various actions.

Without limitation, for instance, a media-measurement server 126 could use this information as a basis to establish and/or enhance ratings statistics, which could in turn serve to control later ad or program placement. For example, by aggregating and analyzing this data from multiple panelist sites, the media-measurement server 126 may determine that panelists of a particular demographic tend to receive media from a particular brand of media-delivery device, and the media-measurement server 126 may output associated ratings statistics that may inform decisions to advertise or place other content on that brand of media-delivery device.

A computing system that carries out this process and/or a part of this process could take various forms and could be provided in various locations, such as at the panelist site 100 and/or at a back office system operated by a media-measurement company, among other possibilities As one example, the computing system could be provided by a media-measurement server 126 or the like, having access to information gathered by the first meter 106 and the second meter 108. For instance, (i) the first meter 106 could report to the media-measurement server 126 times when the first meter 106 detects presentation of media by television 102, (ii) the second meter 108 could report to the media-measurement server 126 times when the second meter 108 detected that media was transmitted to a LAN node having particular determined node-identifying information such as brand, model, etc., and (iii) the media-measurement server 126 could correlate these reports together based on common timing, as a basis to conclude that the node having the indicated node-identifying information is the media-delivery node that delivered the media to the television 102 to facilitate the presentation.

As another example, the computing system could be provided by one of the meters 106, 108. For instance, the first meter 106 could carry out the process based on information that it gathers and information that the second meter 108 gathers. In particular, (i) the first meter 106 could record times when the first meter 106 detects presentation of media by the television 102, (ii) the second meter 108 could report to the first meter 106 times when the second meter 108 detected that media was transmitted to a LAN node having particular determined node-identifying information such as brand, model, etc., and (iii) the first meter 106 could correlate this media-presentation activity with the media-transmission activity, as a basis to conclude that the node having the indicated node-identifying information is the media-delivery node that delivered the media to the television 102 to facilitate the presentation. Alternatively, the second meter 108 could carry out the process based on information that it gathers and information that the first meter 106 gathers. Further, if one of the meters 106, 108 carries out this process, that meter may report to a media-measurement server 126 the determined node-identifying information of the media-delivery device at issue.

The computing system that carries out this process may thus determine the identity of the media-delivery device at the panelist site 100 that is the device responsible for delivering to the television 102 the media that was the subject of determined (e.g., credited) media exposure at the panelist site. The computing system may make this determination based on (i) first-meter data that indicates the media was presented by the television 102 at a given time, (ii) second-meter data that indicates that a streaming-media session flowed at the panelist site 100 to that media-delivery device at the panelist site 100 at the given time, and (iii) determined identifying information of that media-delivery device.

In an example implementation, the computing system may receive some or all of this information and/or may derive some or all of this information from other information. For instance, the computing system may receive the first-meter data indicating that the media was presented by the television 102 at a given time and the second meter data that indicates that streaming-media flowed over the LAN 110 at that same time to a particular IP address associated with a particular MAC address. The computing system may then correlate these data points based on their timestamps to determine that the detected media presentation at that time was presentation of the media flowing over the LAN 110 to that destination MAC address at that time and thus that the device having that MAC address is responsible for delivering the media to the television 102 to facilitate the detected presentation. Further, by querying mapping data as noted above, the computing system may map the indicated destination MAC address to device-identifying information such as a brand and possibly model of the device. So the computing system can thereby determine that the device determined to be responsible for delivering the media to the television 102 to facilitate the detected presentation has the determined device-identifying information.

Note that various determinations in this process may or may not be correct in every instance. There may be times when the computing system correlates media presentation with media transmission based on timestamps but when the media transmission turns out to be associated with other media presentation (e.g., presentation by another device). However, the computing system may still perform that correlation and draw the conclusion, and the conclusion may be correct in many or most cases as well.

Further, the computing system could also take into account one or more other factors in this process.

For instance, the computing system may further take into account information about the source of the streaming media and information about the identity of the presented media, as a basis to correlate the media transmission with the media-delivery device and therefore as a further basis for the conclusion that the endpoint of the media transmission is the media-delivery device responsible for delivering the media presented.

By way of example, based on packet monitoring performed by the second meter 108, the computing system could determine the source of a streaming-media session that is flowing over the LAN 110 to the media-delivery device—e.g., by mapping the associated global IP address to a streaming-media provider. Further, based on media-signature data as noted above, the computing system and/or another entity may determine an identity of the media presented. Still further, the computing system may then use that determined media identity as a basis to determine an exclusive media source of the identified media, e.g., by referring to data that correlates various media with various media sources. The computing system may then perform a comparison and find with sufficient certainty that the determined exclusive media source of the identified media matches the determined source of the streaming-media session flowing to the media-delivery device. And the computing system could use this matching as a further basis to associate the panelist media-exposure with the media-delivery device.

Figure 2:
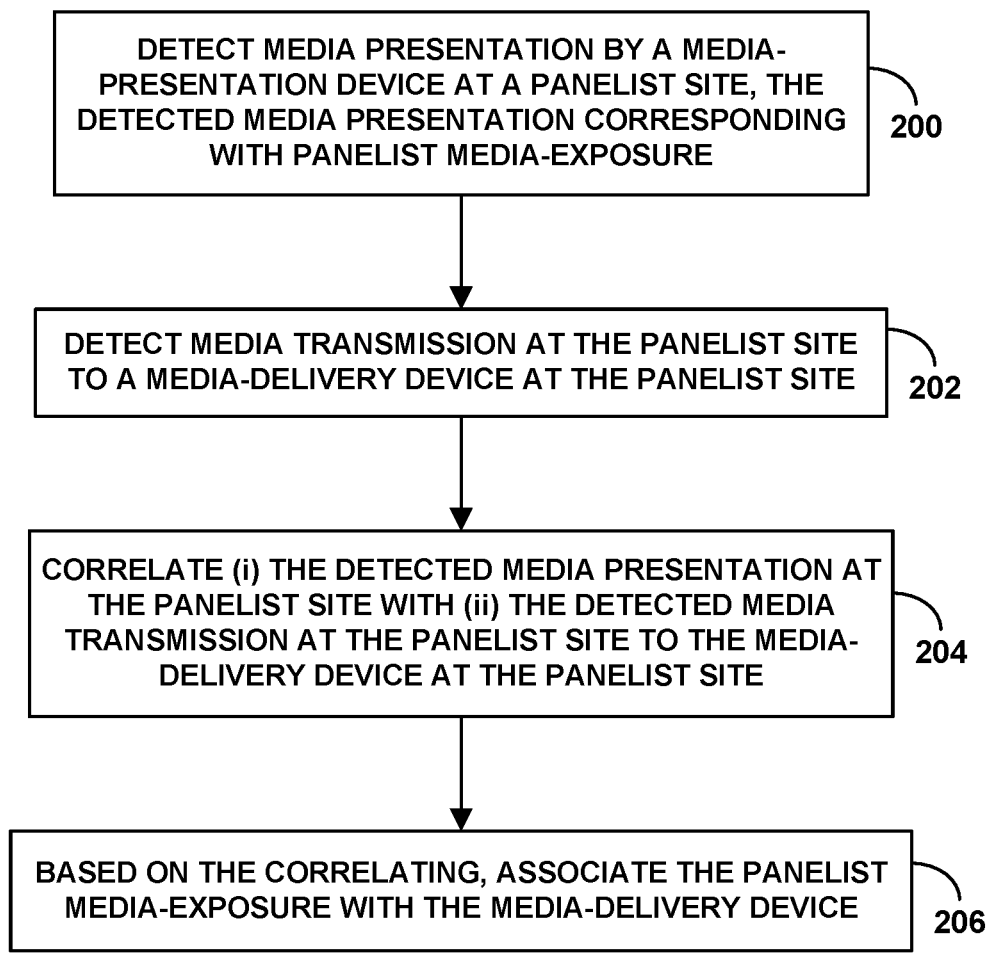
FIG. 2 is a flow chart illustrating an example method.

FIG. 2 is a flow chart illustrating a method that can be carried out in accordance with the present disclosure. As shown in FIG. 2, at block 200, the method could include detecting media presentation by a media-presentation device at a panelist site (i.e., where the media is presented by or from the media-presentation device), the detected media presentation corresponding with panelist media-exposure. At block 202, which could occur in parallel with block 200, the method could include detecting media transmission at the panelist site to a media-delivery device at the panelist site. At block 204, the method could include a computing system correlating (i) the detected media presentation at the panelist site with (ii) the detected media transmission at the panelist site to the media-delivery device at the panelist site.

And at block 206, the method could include, based on the correlating, the computing system associating the panelist media-exposure with the media-delivery device.

In line with the discussion above, the act of correlating the detected media presentation at the panelist site with the detected media transmission at the panelist site to the media-delivery device at the panelist site could be based on timestamps.

Further, as discussed above, the panelist site could be a home, the media-presentation device could be a television, and the media-delivery device could be a streaming-media player.

Still further, the act of detecting the media presentation by the media-presentation device at the panelist site could be based on (i) detecting that the media-presentation device is powered on and (ii) detecting media flow to the media-presentation device while the media-presentation device is powered on. And/or the act of detecting the media presentation by the media-presentation device at the panelist site could involve a meter evaluating output of the media-presentation device.

In addition, the media presentation by the media-presentation device could include presentation of media that the media-delivery device delivered to the media-presentation device. And in that case, the method could additionally include (i) obtaining media-signature data from the media, (ii) using the obtained media-signature data to determine an identity of the media, and (iii) associating the panelist media-exposure with the determined identity of the media.

Further, the act of detecting the media transmission at the panelist site to the media-delivery device at the panelist site could involve (i) monitoring network packet flow at the panelist site, using a packet monitor on a LAN at the panelist site and (ii) based on the monitoring, detecting a streaming-media session and detecting that the streaming-media session has the media-delivery device as a receiving endpoint.

Still further, the media presentation by the media-presentation device could include presentation of media that the media-delivery device delivered to the media-presentation device, and the method could additionally involve correlating an exclusive source of that media with a determined source of the media, as a further basis to associate the media-exposure with the media-delivery device.

For instance, the method could include determining, based on the monitoring of the network packet flow on the LAN at the panelist site, a streaming-media source of the streaming-media session. Further, the method could include using media-signature data to identify media presented by the media-presentation device, and/or using such a determined identity of the media presented by the media-presentation device as a basis to determine an exclusive media source of the media presented by the media-presentation device. Still further, the method could include matching the determined exclusive media source of the media presented by the media-presentation device with the determined streaming-media source of the streaming-media session. The act of associating the panelist media-exposure with the media-delivery device could then further be based on the matching of the determined exclusive media source of the media presented by the media-presentation device with the determined streaming-media source of the streaming-media session.

In addition, the act of detecting the media transmission at the panelist site to the media-delivery device at the panelist site could be done without identifying the media being delivered. For instance, the second meter 108 discussed above could detect this media transmission to an IP address and/or MAC address of the media-delivery device based on reading of packet header data without identifying any packet-based media itself.

Further, the act of associating the panelist media-exposure with the media-delivery device could involve generating a record that associates the panelist media-exposure with the media-delivery device. For instance, a media-measurement server may generate this record. Yet further, the method could involve using this generated record as a basis to establish audience-ratings, such as to establish that audience of certain demographics tends to consume media delivered by media-delivery devices of particular brands, among other possibilities.

Figure 3:
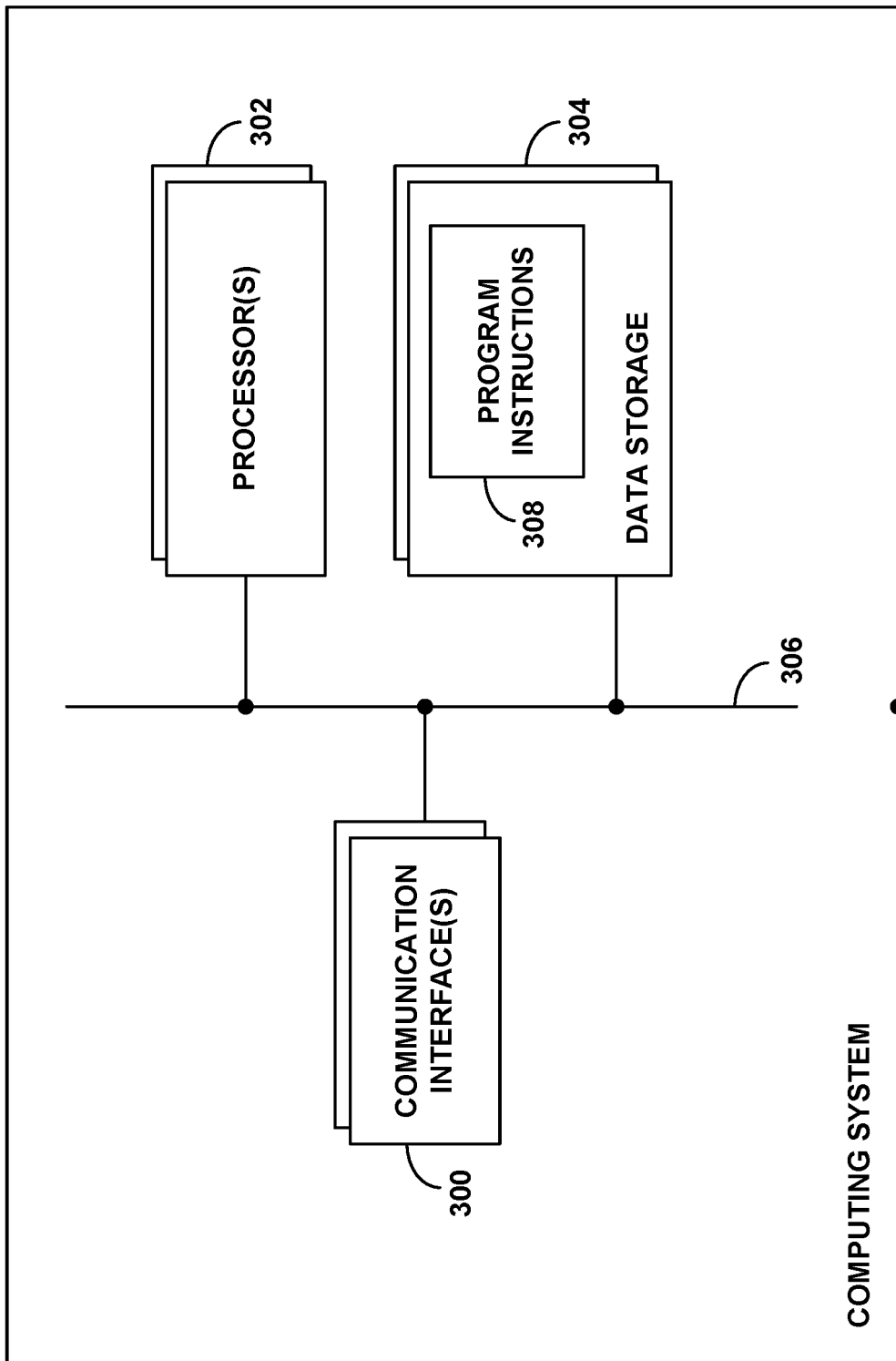
FIG. 3 is a simplified block diagram of an example computing system.

FIG. 3 is a simplified block diagram of a computing system that could be configured to carry out various operations such as those discussed herein. As shown in FIG. 3, the example computing system could include at least one communication interface 300, at least one processor 302, and at least one non-transitory data storage 304, which could integrated together or communicatively linked together by a system bus, network, or one or more other connection mechanisms 306.

The at least one communication interface 300 could comprise one or more interfaces to facilitate wired and/or wireless communication with one or more other entities. Examples of such interfaces could include, without limitation, wired Ethernet interfaces and/or WiFi interfaces.

The at least one processor 302 could comprise one or more general purpose processing units (e.g., microprocessors) and/or one or more specialized processing units (e.g., digital signal processors, dedicated audio processors, dedicated watermark processors, etc.) Further, the at least one non-transitory data storage 304 could comprise one or more volatile and/or non-volatile storage components (e.g., flash, optical, magnetic, ROM, RAM, EPROM, EEPROM, etc.), which may be integrated in whole or in part with the at least one processor 302. As further shown, the at least one non-transitory data storage 304 could store program instructions 308, which may be executable by the at least one processor 302 to carry out various computing-system operations described herein.

Figure 4:
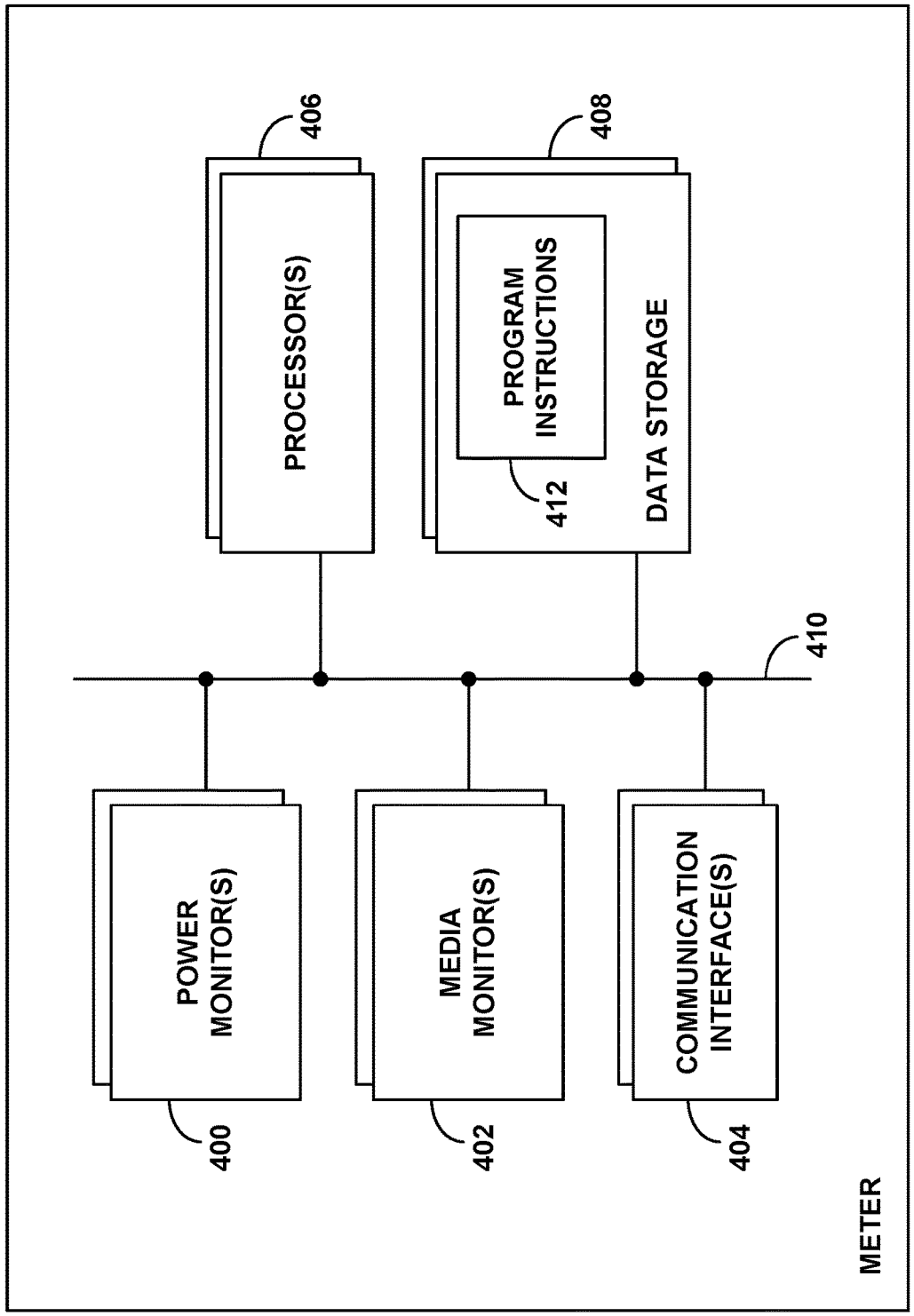
FIG. 4 is a simplified block diagram of an example meter for monitoring media exposure.

FIG. 4 is a simplified block diagram of a meter that may be configured to operate as the first meter 106 discussed above for instance. As noted above, such a meter could be positioned and/or connected in a manner that enables the meter to monitor media presented by a media-presentation device such as the television 102, and that may also enable the meter to monitor the on/off status of the media-presentation device.

As shown in FIG. 4, the example meter includes at least one power monitor 400, at least one media monitor 402, at least one communication interface 404, at least one processor 406, and at least one non-transitory data storage 408, which could integrated together or communicatively linked together by a system bus, network, or one or more other connection mechanisms 410.

The at least one power monitor 400 could comprise a circuit for monitoring power flow to the media-presentation device, such as by tapping into a power-supply path to the media-presentation device and measuring current flow. The at least one power monitor 400 may thus operate to determine when the media-presentation device is powered on and when the media-presentation device is powered off.

The at least one media monitor 402 may comprise one or more microphones and/or cameras and associated processing circuitry or other logic configured to monitor media output from the media-presentation device and/or a circuit for monitoring media flow into the media-presentation device by tapping into a media-delivery path to the media-presentation device. The at least one media monitor 402 may thus operate to detect media presentation by the media-presentation device, which may further include obtaining media-signature data to facilitate identifying the presented media.

The at least one communication interface 404 may comprise one or more wired and/or wireless network interfaces, such as wired Ethernet interfaces and/or WiFi interfaces, to facilitate communication with other entities. For instance, the illustrated meter may use such a communication interface to report logged information to another meter and/or to a media-measurement server, among other possibilities.

The at least one processor 406 may comprise one or more general purpose processing units (e.g., microprocessors) and/or one or more specialized processing units (e.g., digital signal processors, dedicated audio processors, dedicated watermark processors, etc.) Further, the at least one non-transitory data storage 408 may comprise one or more volatile and/or non-volatile storage components (e.g., flash, optical, magnetic, ROM, RAM, EPROM, EEPROM, etc.), which may be integrated in whole or in part with the at least one processor 406. Still further, the at least one non-transitory data storage 408 may store program instructions 412, which may be executable by the at least one processor 406 to carry out various operations described herein.

Figure 5:
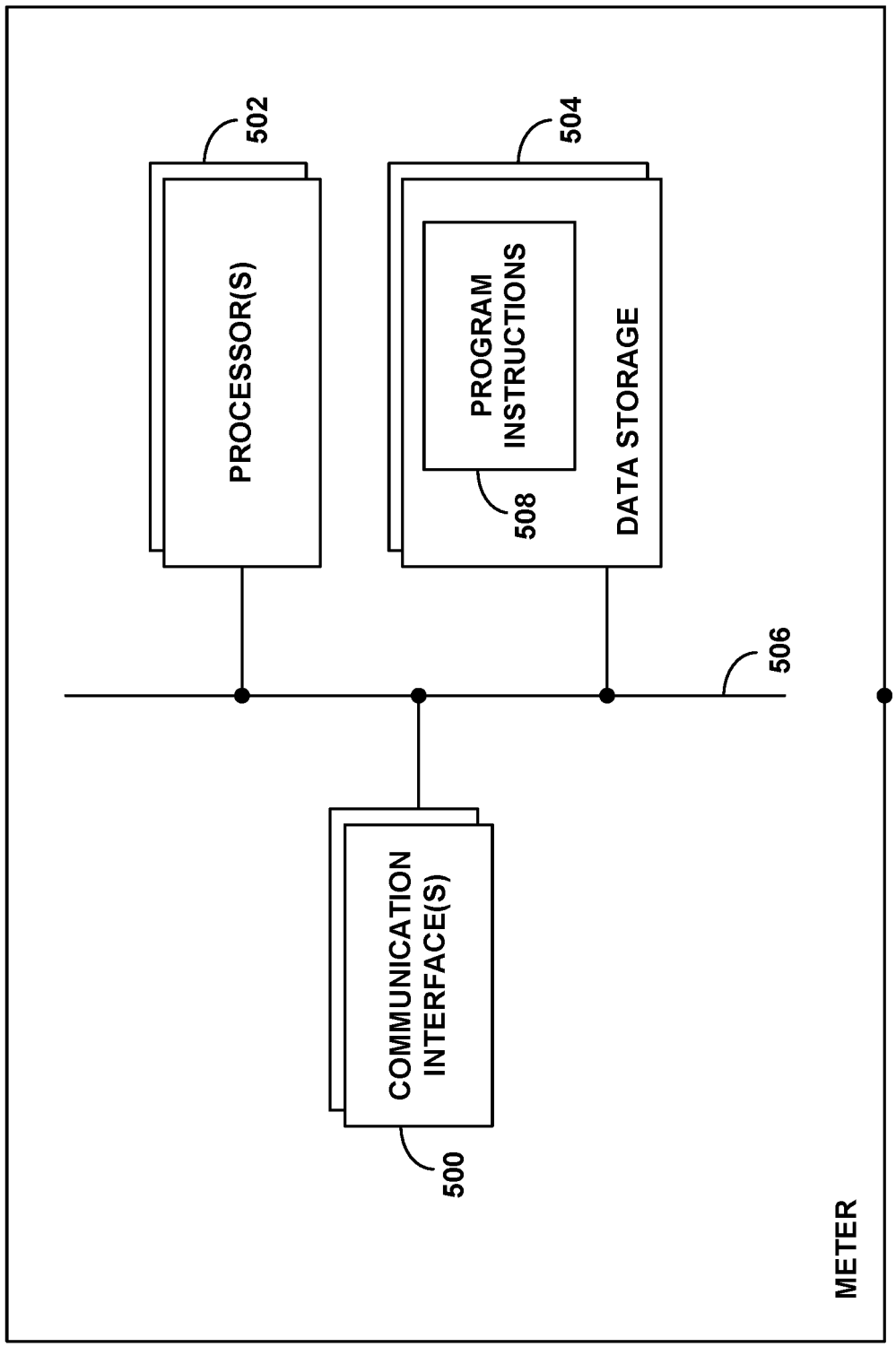
FIG. 5 is a simplified block diagram of an example meter for monitoring packet traffic and media transmission.

FIG. 5 is a simplified block diagram of a meter that may be configured to operate as the second meter 106 discussed above for instance. As noted above, such a meter could be provided in a manner that enables the meter to monitor packet flow on a LAN at a panelist site, so ad to detect media transmission such as streaming-media transmission at the panelist site to a media-delivery device at the panelist site.

As shown in FIG. 5, the example meter includes at least one communication interface 500, at least one processor 502, and at least one non-transitory data storage 504, which could integrated together or communicatively linked together by a system bus, network, or one or more other connection mechanisms 506.

The at least one communication interface 500 may comprise one or more wired and/or wireless network interfaces, such as wired Ethernet interfaces and/or WiFi interfaces, to facilitate communication with other entities. For instance, the illustrated meter may use such a communication interface to engage in packet-sniffing on the LAN so as to detect on the LAN packet traffic that indicates media transmission, such as streaming-media transmission, to a LAN endpoint. Further, the meter may use such a communication interface to report logged information to another meter and/or to a media-measurement server, among other possibilities.

The at least one processor 502 may comprise one or more general purpose processing units (e.g., microprocessors) and/or one or more specialized processing units (e.g., digital signal processors, dedicated audio processors, dedicated watermark processors, etc.) Further, the at least one non-transitory data storage 504 may comprise one or more volatile and/or non-volatile storage components (e.g., flash, optical, magnetic, ROM, RAM, EPROM, EEPROM, etc.), which may be integrated in whole or in part with the at least one processor 502. Still further, the at least one non-transitory data storage 504 may store program instructions 508, which may be executable by the at least one processor 502 to carry out various operations described herein.

The present disclosure also contemplates at least one non-transitory computer readable medium that is encoded with, stores, or otherwise embodies program instructions executable by at least one processor to carry out various operations as described above.

Exemplary embodiments have been described above. Those skilled in the art will understand, however, that changes and modifications may be made to these embodiments without departing from the true scope and spirit of the invention.

We claim:

1. A system comprising:
   a first meter configured to detect media presentation by a media-presentation device at a panelist site, the detected media presentation corresponding with panelist media-exposure;
   a second meter configured to detect media transmission at the panelist site to a media-delivery device at the panelist site wherein the second meter comprises a packet monitor configured to monitor packet flow on a local area network (LAN) at the panelist site, and wherein the second meter is configured to detect the media transmission at the panelist site to the media-delivery device at the panelist site by (i) detecting, based on the monitoring of the packet flow on a LAN at the panelist site, a streaming-media session and (ii) detecting that the streaming-media session has the media-delivery device as a receiving endpoint; and
   program instructions stored in non-transitory data storage and executable by at least one processor to carry out operations including (i) correlating the detected media presentation at the panelist site with the detected media transmission at the panelist site to the media-delivery device at the panelist site and (ii) based on the correlating, associating the panelist media-exposure with the media-delivery device,
   wherein the media presentation by the media-presentation device comprises presentation of media that the media-delivery device delivered to the media-presentation device,
   wherein the operations additionally include (i) determining, based on the monitoring of the network packet flow on the LAN at the panelist site, a streaming-media source of the streaming-media session, (ii) using media-signature data to identify media presented by the media-presentation device, and using the determined identity of the media presented by the media-presentation device as a basis to determine an exclusive media source of the media presented by the media-presentation device, and (iii) matching the determined exclusive media source of the media presented by the media-presentation device with the determined streaming-media source of the streaming-media session, and
   wherein associating the panelist media-exposure with the media-delivery device is further based on the matching of the determined exclusive media source of the media presented by the media-presentation device with the determined streaming-media source of the streaming-media session.

2. The system of claim 1, wherein the correlating of the detected media presentation at the panelist site with the detected media transmission at the panelist site to the media-delivery device at the panelist site is based on timestamps.

3. The system of claim 1, wherein the panelist site is a home, the media-presentation device is a television, and the media-delivery device is a streaming-media player.

4. The system of claim 1, wherein the first meter is configured to detect the media presentation by the media-presentation device at the panelist site based on (i) detecting that the media-presentation device is powered on and (ii) detecting media flow to the media-presentation device while the media-presentation device is powered on.

5. The system of claim 1, wherein the first meter is configured to detect the media presentation by the media-presentation device at the panelist site based on media output from the media-presentation device.

6. The system of claim 1, wherein the media presentation by the media-presentation device comprises presentation of media that the media-delivery device delivered to the media-presentation device, the operations further including:
  obtaining media-signature data from the media;
  using the obtained media-signature data to determine an identity of the media; and
  associating the panelist media-exposure with the determined identity of the media.

7. The system of claim 1, wherein associating the panelist media-exposure with the media-delivery device comprises generating a record that associates the panelist media-exposure with the media-delivery device,
  wherein the operations further include using the generated record as a basis to establish audience-measurement ratings.

8. A method comprising:
  detecting media presentation by a media-presentation device at a panelist site, the detected media presentation corresponding with panelist media-exposure;
  detecting media transmission at the panelist site to a media-delivery device at the panelist site, wherein detecting the media transmission at the panelist site to the media-delivery device at the panelist site comprises (i) monitoring network packet flow at the panelist site, using a packet monitor on a local area network (LAN) at the panelist site and (i) based on the monitoring, detecting a streaming-media session and detecting that the streaming-media session has the media-delivery device as a receiving endpoint;
  correlating, by a computing system, (i) the detected media presentation at the panelist site with (ii) the detected media transmission at the panelist site to the media-delivery device at the panelist site; and
  based on the correlating, associating, by the computing system, the panelist media-exposure with the media-delivery device,
  wherein the media presentation by the media-presentation device comprises presentation of media that the media-delivery device delivered to the media-presentation device,
  wherein the method further comprises (i) determining, based on the monitoring of the network packet flow on the LAN at the panelist site, a streaming-media source of the streaming-media session, (ii) using media-signature data to identify media presented by the media-presentation device, and using the determined identity of the media presented by the media-presentation device as a basis to determine an exclusive media source of the media presented by the media-presentation device, and (iii) matching the determined exclusive media source of the media presented by the media-presentation device with the determined streaming-media source of the streaming-media session, and
  wherein associating the panelist media-exposure with the media-delivery device is further based on the matching of the determined exclusive media source of the media presented by the media-presentation device with the determined streaming-media source of the streaming-media session.

9. The method of claim 8, wherein the correlating of the detected media presentation at the panelist site with the detected media transmission at the panelist site to the media-delivery device at the panelist site is based on time-stamps.

10. The method of claim 8, wherein the panelist site is a home, the media-presentation device is a television, and the media-delivery device is a streaming-media player.

11. The method of claim 8, wherein detecting the media presentation by the media-presentation device at the panelist site is based on (i) detecting that the media-presentation device is powered on and (ii) detecting media flow to the media-presentation device while the media-presentation device is powered on.

12. The method of claim 8, wherein detecting the media presentation by the media-presentation device at the panelist site comprises a meter evaluating output of the media-presentation device.

13. The method of claim 8, wherein the media presentation by the media-presentation device comprises presentation of media that the media-delivery device delivered to the media-presentation device, the method further comprising:
  obtaining media-signature data from the media;
  using the obtained media-signature data to determine an identity of the media; and
  associating the panelist media-exposure with the determined identity of the media.

14. The method of claim 8, wherein detecting the media transmission at the panelist site to the media-delivery device at the panelist site does not involve identifying the media.

15. The method of claim 8, wherein associating the panelist media-exposure with the media-delivery device comprises generating a record that associates the panelist media-exposure with the media-delivery device,
  wherein the method further comprises using the generated record as a basis to establish audience-measurement ratings.

16. At least one non-transitory computer-readable medium having stored thereon program instructions executable by at least one processor to carry out operations including:
  receiving media-presentation data indicating media presentation by a media-presentation device at a panelist site, the media presentation corresponding with panelist media-exposure;
  receiving media-transmission data indicating media transmission at the panelist site to a media-delivery device at the panelist site, wherein the media-transmission data is established by (i) monitoring network packet flow at the panelist site, using a packet monitor on a local area network (LAN) at the panelist site and (ii) based on the monitoring, detecting a streaming-media session and detecting that the streaming-media session has the media-delivery device as a receiving endpoint;
  correlating the indicated media presentation at the panelist site with the indicated media transmission at the panelist site to the media-delivery device at the panelist site; and
  based on the correlating, associating the panelist media-exposure with the media-delivery device,
  wherein the media presentation by the media-presentation device comprises presentation of media that the media-delivery device delivered to the media-presentation device,
  wherein the operations additionally include (i) determining, based on the monitoring of the network packet flow on the LAN at the panelist site, a streaming-media source of the streaming-media session, (ii) using media-signature data to identify media presented by the media-presentation device, and using the determined identity of the media presented by the media-presentation device as a basis to determine an exclusive media source of the media presented by the media-presentation device, and (iii) matching the determined exclusive media source of the media presented by the media-presentation device with the determined streaming-media source of the streaming-media session, and wherein associating the panelist media-exposure with the media-delivery device is further based on the matching of the determined exclusive media source of the media presented by the media-presentation device with the determined streaming-media source of the streaming-media session.

* * * * *